Jan. 13, 1948.  R. R. ALLEN  2,434,479
REEL ASSEMBLY
Filed Feb. 15, 1946
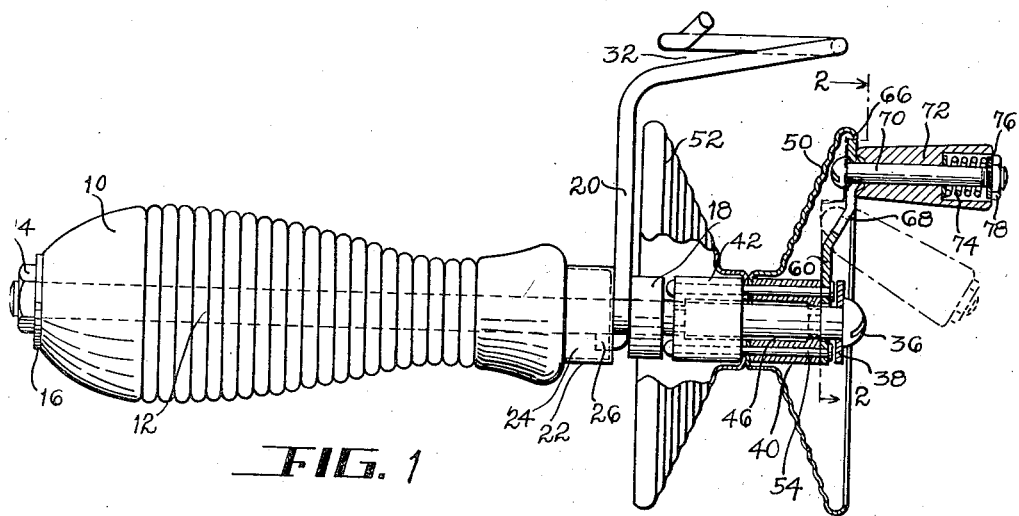
FIG. 1
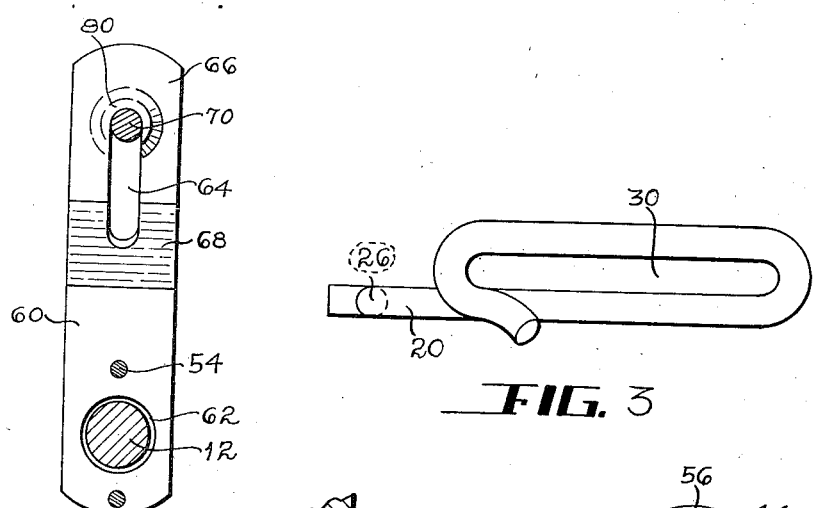
FIG. 2
FIG. 3
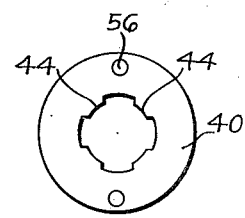
FIG. 5
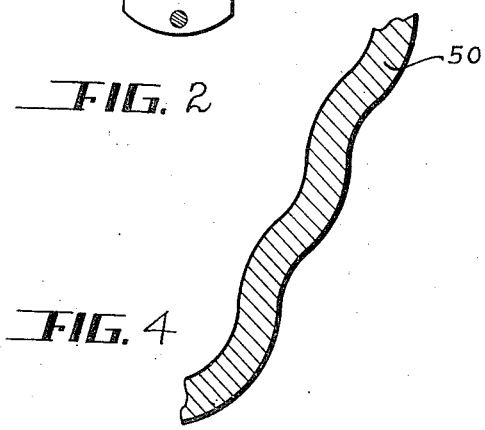
FIG. 4
INVENTOR
Roney R. Allen
BY
Henry G. Dyhrig
HIS ATTORNEY Patented Jan. 13, 1948

2,434,479

UNITED STATES PATENT OFFICE 2,434,479

REEL ASSEMBLY

Raney R. Allen, Dayton, Ohio

Application February 15, 1946, Serial No. 647,860

2 Claims. (Cl. 242—96)

This relation relates to a fishing reel and more particularly to a fishing reel that may be used without a rod.

An object of this invention is to provide a fishing reel adapted for use without a rod, wherein the reel may be wound by one hand while the reel assembly is held in the other hand, the handle for rewinding the reel collapsing out of range of the line when cast in a direction parallel to the longitudinal axis of the reel, so that the handle will not interfere with the line while it is being cast.

Another object of this invention is to provide a reel having a spool that is adapted to receive the line without seriously binding the line while it is being wound in position.

Another object of this invention is to provide a reel having a spool wherein the walls of the spool are conical in shape and provided with corrugations or annular grooves and ridges of opposite walls, having the corresponding tangents normal to the axis either parallel or divergent.

Other objects and advantages reside in the construction of parts, the combination thereof and the mode of operation, as will become more apparent from the following description.

In the drawings,

Figure 1 is a side elevational view of the fishing reel, showing a portion of the reel and the crank handle in section.

Figure 2 is a cross sectional view taken substantially on the line 2—2 of Figure 1.

Figure 3 is a top plan view of the line guide.

Figure 4 is an enlarged cross sectional view of a portion of one side of the spool.

Figure 5 is an end view of a hub member.

Referring to the drawings, the reference character 10 indicates a hand grip handle supporting a shaft or axle 12 held in position by a nut 14 seated against a suitable washer 16. The axle 12 supports and has fixedly attached thereto a collar 18 that cooperates with the nut 14 to clamp a line guiding member 20 between the collar 18 and a ferrule 22 overlying the end 24 of the handle 10. The line guiding member 20 is provided with a projection 26 seated in a suitable aperture in the ferrule 22 and the end 24 of the handle 10. The outer end of the line guiding member 20 forms a rectangular slot 30, as best seen in Figure 3, and is provided with an opening 32 for threading the line into position. The slot overlies the spool, which will now be described.

The outer end of the axle 12 is provided with a kerfed head 36 adjacent a washer or collar 38. A pair of hub members 40 and 42 are rotatably mounted upon the shaft 12 and positioned between the collar 18 and the collar 38. Each of the hub members is provided with internally projecting bearing portions 44, as best seen in Figure 5. There are four of these bearing portions shown in Figure 5. Any suitable number may be used. The remainder of the hub portion is provided with an enlarged cylindrical recess 46 that is arranged in spaced relation from the axle 12. This arrangement has been used so as to reduce friction between the hub and the axle 12.

A pair of conical, corrugated spool members 50 and 52 are provided with internally disposed flange portions clamped between the hub members 40 and 42 and held in position by suitable rivets 54 passing through the apertures 56 in the hub members 40 and 42 and in registering apertures in the internally disposed flange portions of members 50 and 52. The tangents of the annular corrugations of members 50 and 52 are either parallel to or divergent with respect to corresponding tangents of an oppositely disposed rib in the other spool member. In other words, the corrugations are so designed that even though a convolution of the line may be nested against a valley of a corrugation, it will not be bound in position. The spool may be rotated so as to wind the line through a collapsible crank mechanism, which will now be described.

The outer ends of the rivets 54 pass through suitable apertures in a crank arm 60. This crank arm 60 is provided with an annular aperture 62 receiving the axle 12. The outer end of the crank arm is offset from the plane of the inner end. A radially disposed slot 64 extends from the outer end portion 66 into the diagonally disposed portion 68. This slot 64 receives a crank pin or bolt 70, supporting a crank handle 72 urged inwardly against the crank arm by a helical spring 74 abutting a washer 76 held in position by a suitable nut 78. Adjacent the outer end of the slot 64, the handle is provided with a projected area 80 that projects into a suitable recess in the end of the crank handle 72 when the crank handle is in the full line position shown in Figure 1. Due to the cooperation of the spring 74, the crank handle 72 is held in this position by the projection 80 engaging the recess in the crank handle 72. Thus, the crank handle remains in this position while the handle is used in rewinding the line.

When casting, it is preferable to remove the line from the guide 20, which may be easily facilitated by removing the line through the opening 32. In casting, the line is preferably withdrawn from the end in a direction parallel to the longitudinal axis of the reel assembly. While casting, there is a tendency for the handle when in the full line position shown in Figure 1 to engage the line, especially if the line has a tendency to whip, and thereby tangle and snarl the line. In order to avoid this difficulty, the crank handle may be moved downwardly into the slot 64, into the dot-dash position shown in Figure 1. This may be accomplished by pulling outwardly on the crank handle 72, so as to compress the spring 74 to permit the inner end of the crank handle to clear the projected area 80, at which time the crank handle may be easily slid into the dot-dash position shown in Figure 1. When in this position, the outer end of the crank handle is practically co-axial with the axis of rotation of the spool, so that the crank handle remains in the center and therefore does not interfere with the line being cast.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A reel assembly including a hand grip handle, a shaft extending through the handle, a collar mounted upon the shaft in spaced relation from the end thereof, a spool including a hub rotatably mounted upon the shaft beyond the collar, a line-levelling device clamped between the collar and the handle, and a collapsible crank handle for rotating the spool, said collapsible handle having an operative and an inoperative position.

2. A reel assembly including a hand grip handle, a shaft extending through the handle, a collar mounted upon the shaft in spaced relation from the end thereof, a spool including a hub rotatably mounted upon the shaft beyond the collar, a line-levelling device clamped between the collar and the handle, and means for rotating said spool, said means including a slotted crank arm, said crank arm extending radially from the shaft to the slotted portion then diverging away from the spool throughout a portion of the slotted portion, and a crank slidably mounted in the slot so that the crank extends parallel to the axis of rotation when in the remote outer position, said crank extending at an angle so as to project towards the axis of rotation when in the extreme inner position.

RANEY R. ALLEN.